April 21, 1964   M. ROUANET   3,129,609
CRANK DRIVE WITH TORQUE-REDUCING DEVICE
Filed Jan. 30, 1961   3 Sheets-Sheet 1

United States Patent Office 3,129,609
Patented Apr. 21, 1964

3,129,609
CRANK DRIVE WITH TORQUE-REDUCING DEVICE
Michel Rouanet, 27 Rue des Girondins, Saint-Cloud, Seine-et-Oise, France
Filed Jan. 30, 1961, Ser. No. 85,836
Claims priority, application France Feb. 4, 1960
7 Claims. (Cl. 74—751)

This invention relates to crank drives, and more particularly to those used for fishing reels.

In these reels an adjustable or non-adjustable friction coupling is habitually interposed between the two end components, i.e. between the driving crank at the one end and the line winder or the spool at the other and the purpose of this coupling being to limit the winding torque to a value determined by the resistance of the fishing-line used, in order to prevent breakage of the line when excessive force is exerted by the fish.

To facilitate manufacture, it is preferable to dispose the friction coupling between the crank and the transmission mechanism. But since the resistance of the latter is not a negligible factor, and taking in account the usual multiplying ratio of the transmission device, it follows that the slip of the friction coupling necessitates the exertion of a greater force on the winder side than on the crank side, whereas it is quite obvious that it is the opposite that is desirable.

The object of the present invention is to remedy this difficulty, and this is done by controlling the friction coupling by means of a planetary device arranged in such a way that the torque required for the slip is less on the winder side than on the crank side.

Epicyclic transmissions for fishing winches are already known, such transmissions being used either to obtain two predetermined transmission ratios or else as an adjustable or non-adjustable torque reducing device, either with or without a system for varying the adjustment as required during winding (see, by way of example, my U.S.A. Patent 2,918,227).

In such known application of the prior art, the epicyclic component is a part of the transmission and acts as a gearing up device, whereas in the present case it is not a part of the transmission, but only a torque-reducing device; there the transmission is direct—i.e. there is no gearing-up effect—when the force transmitted is less than that required to produce the friction slip.

Some embodiments of the invention will be described hereinafter, it being understood, however, that the applicant does not intend limiting the generic scope of his invention either to or by the specific features of the examples chosen by way of illustration.

Figure 2:
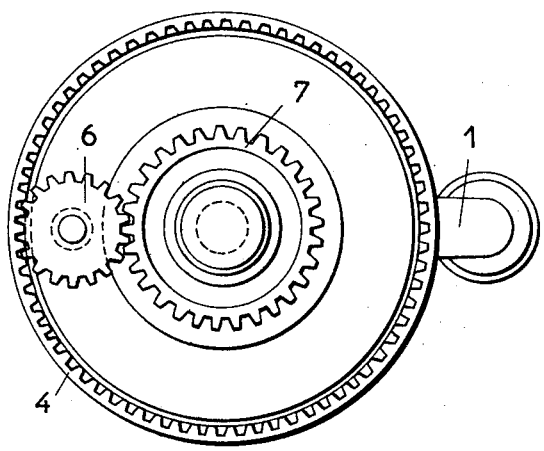
FIGURE 2 is a front view of this system.
Figure 1:
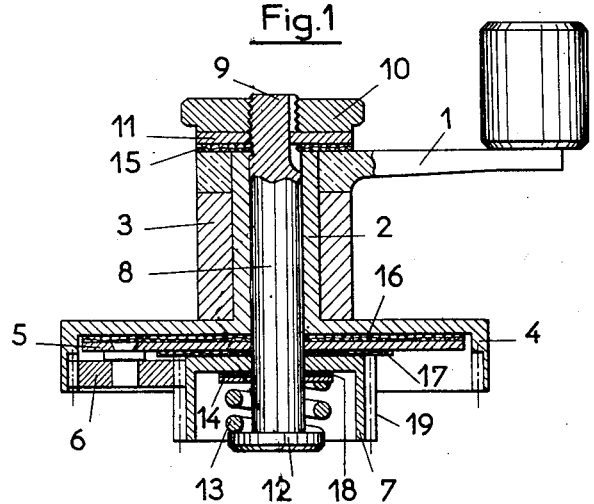
FIGURE 1 is a section through the braking system, in a plane passing through the axis of the crank.

FIGURES 1 and 2 in the drawings show only the part of the reel which is actually affected by the invention; this was considered the more particularly advisable in view of the fact that the system illustrated—and this may be considered as a further feature of the present invention—constitutes a complete whole which can be considered as a crank drive containing its own torque-reducing device, suitable for use either in conjunction with the transmission mechanism of a fishing reel or else with any other transmission mechanism where the problem requiring solution is the same as the one solved in the case of this particular embodiment.

On the FIGURES 1 and 2, 1 designates the crank, which is rigid with hollow shaft 2, turning in bushing 3, the latter being rigid—in a manner not specified—with the casing of the reel, which is not shown on the drawing. Hollow shaft 2 is rigid with the crown 4 of an epicyclic mechanism with carrier 5, the satellites—of which only one is actually shown—being designated by 6 and the sun wheel by 7. Carrier and sun wheel rotate freely on the shaft 8, which is housed in the hollow shaft 2. The threaded shank 9 of the shaft 8 has locking nut 10 screwed on to it, 11 being a washer keyed to shaft 8. The latter is provided with the shaft head 12, and a helical spring is interposed between this head and the sun wheel 7, resting on the latter via bearing washer 14, 15, 16, 17 and 18 designate the friction washers.

With this system of assembly, carrier 5 is gripped between washers 16 and 17 and sun-wheel 7 is gripped between washers 14 and 17 by the action of the spring 13, this action being adjustable as required by means of the nut 10. Angular movement of the carrier may be obtained by exerting a torque sufficient to overcome the friction. The sufficient value of the torque action will be less if exerted on the satellites 6 by means of sun wheel 7 than if exerted by means of crown 4. In other words, in the one direction the force required for slip is geared up, while in the other it is geared down. It is perfectly obvious, on the other hand, that where the critical torque value has not been reached the epicyclic gear train does not interfere in the transmission ratio and the wheel 7 will have exactly the same angular velocity as the crank.

Figure 3:
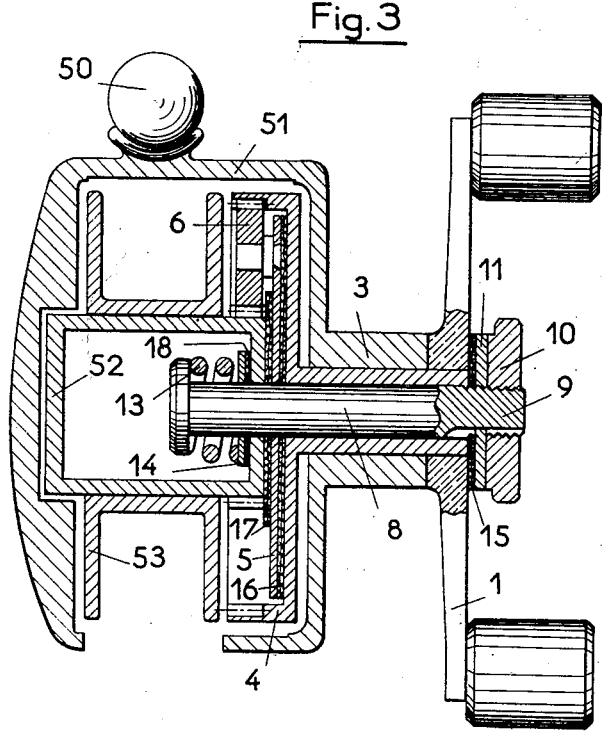
FIGURE 3 is an embodiment which has been chosen very similar to the embodiment described in my Patent 2,918,227 (FIG. 2), to emphasize the differences between both inventions.

The embodiment shown in FIGURE 3 is represented as an axial section through a reel of the rotary spool type, in which the axis of the spool is perpendicular to the fishing rod 50. In such reels the spool rotates as the line unwinds.

In this figure, the same references as in FIG. 1 have been used for parts performing the same functions.

The crank 1 and the crown 4, rigid with one another in rotation, rotate about shaft 8, the bushing 3 being rigid with the casing 51. The sun wheel 7 has been extended to form a hollow cylinder 52 constituting the spool-holder, on which the spool 53 is keyed or fixed by any suitable means, not represented. As explained in the description of FIG. 1, carrier 5 is gripped between washers 16 and 17 and sun wheel 7 is gripped between washers 14 and 17 by the action of spring 13. The angular velocity of spool 53 and of crank 1 is the same when abnormal force exerted by the fish does not cause slipping of the transmission and therefore does not cause a reduction in the transmission ratio. On the contrary, in the embodiment of Patent 2,918,227 shown in FIG. 2 the crown and the sun wheel do not rotate with the same angular velocity even in the absence of abnormal force exerted by the fish.

Figure 7:
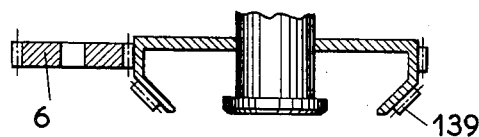
FIGURE 7 shows a modification of FIG. 1 to allow the cooperation with the reel of FIGS. 4–6.

In the embodiment FIGURE 1 the teeth of the sun wheel 7 have been drawn longer in an axial direction than is required for meshing with the satellites 6, the extra tooth-length 19 being the factor enabling transmission to be achieved through the transmission mechanism proper of the reel; the latter has not been shown on FIGURE 1, since—as stated above—it has not to be of a particular design. In FIGURE 7, the part of the wheel 7 on which the extra tooth-length 19 is cut, instead of being cylindrical, as shown in FIGURE 1, is tapered to enable the motion to be transmitted in a direction perpendicular to the axis of rotation of the crank. This bevel crown has been designated by 139.

Figure 4:
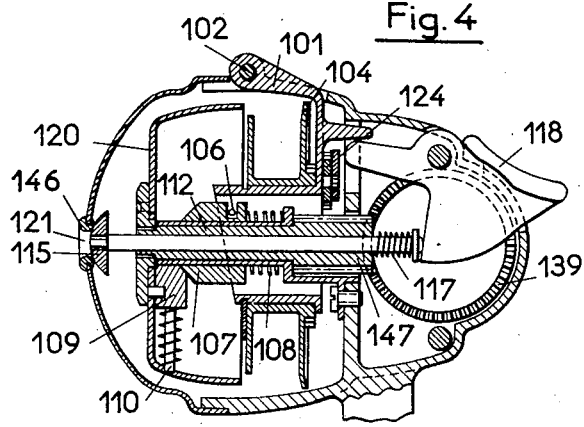
FIGURES 4, 5, 6 are the FIGURES 1, 2, 4 of my co-pending application 816,207, now Patent Number 3,036,789.
Figure 5:
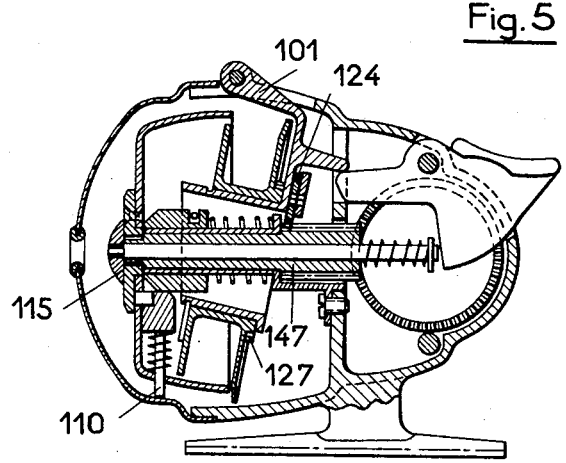
Figure 6:
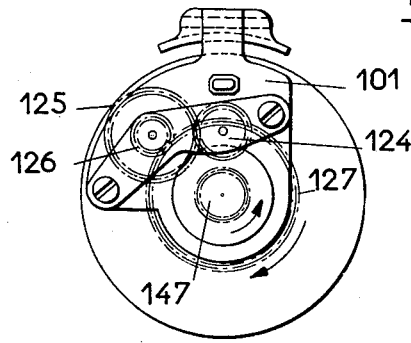

The reel represented in FIGURES 4 to 6, which are the FIGURES 1, 2, 5 of my co-pending application 816,207, included therewith by way of reference, are not properly speaking, an embodiment of the present invention, but is to be considered as one of the several types of reels in which the driving device of FIGURE 1, including torque limiting device, may be substituted for the original driving device, whatever this original driving device may be.

As the reel of FIGURES 4 to 6 is described in detail in my said copending application 816,207, and does not constitute a part of the present invention, a short description of the functioning will be hereinafter given.

The references employed are the same, plus 100, as in my said copending application 816,207.

In the position shown in FIGURE 3, the line (not shown) is wound onto the spool 104. Its free end passes round the pick-up shell 120 and emerges through the cover by the axial aperture 121, the edge of which is lined with an O-ring 146 to prevent abrasion of the line.

In this position, the line is trapped between the mushroom head 115 and the O-ring 146, so that it cannot unwind inadvertently.

To obtain this position, the fisherman has depressed, with a finger of the hand holding the rod, the push member 118, in order to counter the action of the spring 108.

If the fisherman now releases the push member 118, the mushroom head returns to the right under the action of spring 117; on the other hand, the spool-holder 101 will not budge since the conical member 107 is locked in position by the chock 109. This is the casting position, in which the line, under the weight of the baited end, is free to unwind.

When the fisherman wishes to wind in the line, he proceeds to rotate the handle thus promoting the rotation of crown 139 and of the conical member 107. Under the thrust exerted by spring 108, the conical part of member 107 pushes aside the chock 109 and in so doing causes the pick-up 110 to protrude.

At the same time, in its movement, the member 107 draws the spindle 106 along with it and thus causes the reel-holder 101 to swivel about the spindle 102. The unit is then in the position shown in FIGURE 5.

But this swivelling movement causes gearwheel 124 to mesh with pinion 112, so that the spool 104 is then driven in geared-down rotation. In the example shown, the direction of rotation is opposite to that of the pinion 147, which is operatively connected with the spool by the intermediary of gearwheels 124, 125, 126, 127.

Caught up by the pick-up 110, the line then winds itself onto the spool, while the spread required to ensure a honeycomb pattern of windings is obtained by the two conjugated rotational movements.

When winding-in is complete and the fisherman is ready to cast the line once more, he returns the spool to the position shown in FIGURE 4 by depressing the push member 118.

The crown 139, represented in FIGURES 4, 5 is the same as crown 139 of FIGURE 7, thus through this crown, is completed the assembly of the reel represented in FIGURES 4 to 6 with the driving device of FIGURES 1 and 2, modified as shown in FIGURE 7.

Thus has been established, by way of the foregoing example, the possibility of combining the driving device according to my invention with any reel in which a drived wheel such as wheel 139, bevelled or not bevelled, controls the mechanism of the spool and/or of the pick-up device, whatever may be said mechanism.

What I claim is:

1. A driving device including an axial shaft, a hollow shaft mounted to rotate about said axial shaft, a crank and a crown wheel having internal teeth respectively disposed at the extremities of and solid in rotation with said hollow shaft, a satellite carrier and a sun wheel mounted to rotate freely about said axial shaft, at least one satellite carried by said carrier and meshing with said crown wheel and said sun wheel, a first friction washer disposed between said crown wheel and said carrier, a second washer disposed between said carrier and said sun wheel, abutment means on said axial shaft, spring means disposed between said abutment means and said sun wheel and control means to control the tension of said spring means, whereby the washers are firmly maintained in frictional engagement with said crown wheel and said carrier, and with said carrier and said sun wheel respectively.

2. A driving device including a crank and an epicycloidal gear train comprising a sun wheel, a satellite carrier, at least one satellite meshing with said sun wheel, and a crown wheel having internal teeth meshing with said satellite, said crank being solid in rotation with said crown wheel, and resilient means to urge together said sun wheel and said carrier for common rotation.

3. A driving device as set forth in claim 2, in which friction means are interposed between said sun wheel and said carrier.

4. A driving device as set forth in claim 2, including a spring to urge together said sun wheel, said carrier and said crown wheel for common rotation, and friction means interposed between said carrier and said crown wheel.

5. A driving device including a crank and an epicycloidal gear train comprising a sun wheel, a satellite carrier, at least one satellite meshing with said sun wheel, and a crown wheel having internal teeth meshing with said satellite, said crank being solid in rotation with said crown wheel, said sun wheel and said carrier having confronting surfaces, said surfaces being in spaced generally parallel relation, and spring means to urge said surfaces together for common rotation.

6. A driving device as set forth in claim 5, in which friction means are interposed between said both surfaces.

7. A driving device as set forth in claim 5, wherein said crown wheel and said carrier include confronting surfaces, said surfaces being in spaced generally parallel relation, whereby said spring means urge said last-named surfaces together for common rotation.

References Cited in the file of this patent

UNITED STATES PATENTS

| 2,113,515 | Montgrand | Apr. 5, 1938 |
| 2,188,246 | Mirone | Jan. 23, 1940 |
| 2,197,779 | Coxe | Apr. 23, 1940 |
| 2,462,974 | King | Mar. 1, 1949 |
| 2,918,227 | Mouborgne | Dec. 22, 1959 |
| 3,036,789 | Mouborgne | May 29, 1962 |

FOREIGN PATENTS

| 280,561 | Germany | Nov. 21, 1914 |
| 289,300 | Great Britain | Apr. 26, 1928 |